Nov. 12, 1968     R. M. FOX ET AL     3,410,603
CONVERTIBLE TOP REAR RAIL SYNCHRONIZING MEANS
Filed Aug. 26, 1966                  2 Sheets-Sheet 1

INVENTORS
Robert M. Fox &
BY George R. Lyon

David A. Greenlee
ATTORNEY

INVENTORS
Robert M. Fox &
BY George R. Lyon

David A. Greenlee
ATTORNEY

United States Patent Office 3,410,603
Patented Nov. 12, 1968

3,410,603
CONVERTIBLE TOP REAR RAIL
SYNCHRONIZING MEANS
Robert M. Fox, Warren, and George R. Lyon, Birmingham, Mich., assignors to General Motors Corporation, Detroit, Mich., a corporation of Delaware
Filed Aug. 26, 1966, Ser. No. 575,367
7 Claims. (Cl. 296—117)

ABSTRACT OF THE DISCLOSURE

A convertible vehicle body is provided with a folding top structure in which the rear rails have angled pivotal axes to effect inward folding of the convertible top. Each of the rear rails is provided with a gear wheel having a plurality of peripheral teeth. A flexible cable having an outer helical wire engages each of the gear wheels and is confined therebetween in a sheath. Movement of either rear rail effects translation of the cable and subsequent synchronized pivotal movement of both rear rails. In an alternative embodiment, a power actuator drives a jackscrew that engages the cable intermediate its ends so that, upon actuation, the cable is translated to pivot both rear rails in synchronization.

---

This invention relates generally to folding top structures for convertible vehicles and more specifically to means for controlling the movement of the top structure between raised and lowered positions.

Many convertible vehicles are provided with retractable folding top structures that are manually operated. When such structures are folded, a force applied by the vehicle operator at a point other than at the midpoint of the header will result in a binding of the structure. This is caused by the application of unequal forces to the supporting rear rails through the many top structure links, causing the rear rails to pivot out of synchronization. This binding necessitates a great manual effort to fold the top structure and may result in damage to it. Binding of the top structure during folding is an even more serious problem in an inward folding top wherein the rear rail pivots are not coaxial.

This invention solves the problem of binding of the rear rails during folding by providing means for synchronizing the pivotal movement of both rear rails so that a force applied to the top structure at any point will result in smooth folding and greatly reduced operator effort. This invention also provides means for adapting the synchronizing means to a power actuating mechanism, resulting in less strain on the power actuator during folding and unfolding movement of the top structure.

One feature of this invention is that it provides synchronizing means for interconnecting the rear rails of a folding top structure to synchronize their pivotal movement. Another feature is that the synchronizing means includes take-up means associated with each rear rail and a flexible synchronizing member engaging the take-up means and being translatable therebetween. Yet another feature is that the take-up means include gear wheels pivotable with the rear rails and the synchronizing member is a flexible spiral-wound cable having an outer helical wire drivingly engaging the gear wheels.

Still another feature is that the flexible cable is adapted to be driven by power actuating means to effect pivotal movement of both rear rails. A further feature is that a power source drives a drive unit which engages the flexible cable outer helical wire to effect translation thereof. A yet further feature is that a single power source drives a drive unit jackscrew which drivingly engages the flexible cable outer helical wire to effect translation of the cable and consequent synchronized pivotal movement of the rear rails.

These and other features of this invention will become readily apparent upon reference to the following detailed description of the attached drawings in which.

Figure 1:
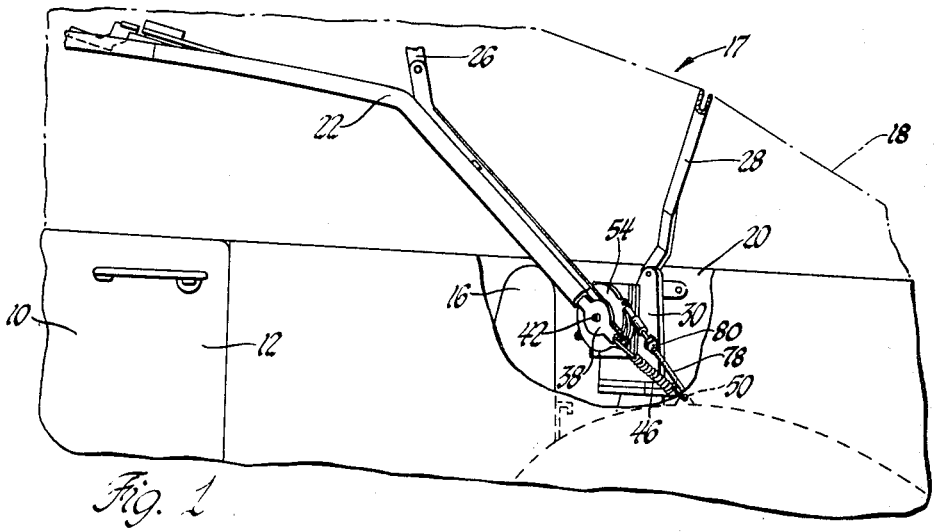
FIGURE 1 is a partial side view of a convertible vehicle body employing rear rail synchronizing means according to this invention.
Figure 2:
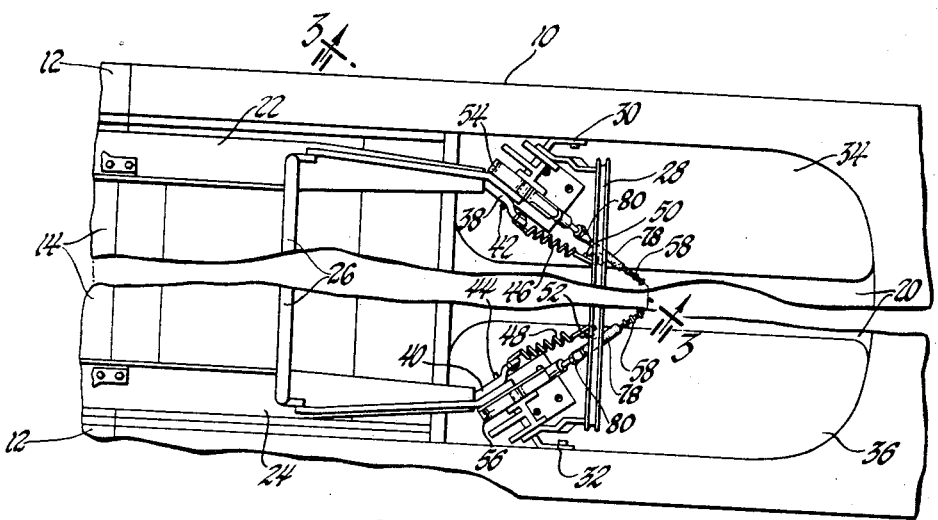
FIGURE 2 is a partial plan view of the vehicle body.

Referring now to FIGURES 1 and 2 of the drawings, a convertible vehicle body, generally designated 10, includes a side door 12 which provides access to a passenger compartment 14 that includes a rear passenger seat 16. Body 10 is adapted to be closed by a folding top structure 17, including a top covering 18, that is manually movable between raised position, illustrated, and a lowered position, not shown, in which the top structure is stored within a storage well 20. The top structure includes a pair of rear rails 22 and 24 and a plurality of top supporting bows, of which only the intermediate bow 26 and the rear bow 28 are shown. Top structure 17 is of the inward folding type similar to that shown in U.S. Patent No. 3,097,883 Gilson et al.

A pair of top supporting brackets 30 and 32 are bolted to rear wheel housings 34 and 36 within the top storage well 20. The ends of rear bow 28 are pivotally supported by the upper ends of brackets 30 and 32. The respective lower end portions 38 and 40 of rear rails 22 and 24 are fixed to pivot pins 42 and 44 that are journaled in the respective brackets 30 and 32. The top structure 17 is manually movable between raised and lowered positions by applying a force to the top structure which pivots rear rails 22 and 24 and causes the top structure to fold and move into storage well 20. A pair of overcenter springs 46 and 48 extend between the rail ends 38 and 40 and brackets 50 and 52 mounted on rear wheel housings 34 and 36 to assist the raising and lowering of the top structure.

As shown in FIGURE 2 a pair of take-up devices 54 and 56 are mounted on respective brackets 30 and 32 between rail ends 38 and 40 and the brackets. These take-up devices are interconnected by a flexible member or cable 58 which provides means for synchronizing movement of the rear rails. The take-up devices are substantially identical and are each rigidly affixed to the support brackets 30 and 32.

Figure 3:
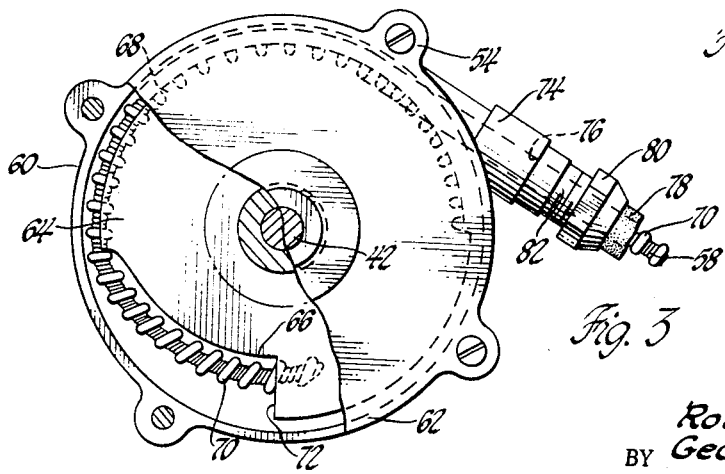
FIGURE 3 is an enlarged partially broken away view of the synchronizer take-up means.

Take-up device 54 is shown in detail in FIGURE 3 and includes a housing member 60 and a cover 62 which journal the pivot pin 42. A gearing member in the form of a gear wheel 64 is rigidly attached to pivot pin 42. Wheel 64 includes a cut-away portion 66 and has a plurality of hobbed teeth 68 which extend approximately half way around the periphery of the wheel.

Cable 58 is a conventional flexible spiral-wound cable having an outer helical wire 70 that drivingly engages teeth 68. The end of the cable extends into cut-away portion 66 and is rigidly attached to one wall 72 of wheel 64. Housing member 60 includes an upper tangential fitting 74 which includes a bore 76 through which cable 58 enters the take-up device. Cable 58 is carried by an axially rigid but bendable sheath 78 which is connected by a nut 80 to the threaded end portion 82 of fitting 74. Cable 58 and its sheath 78 may be conveniently placed anywhere within well 20. Take-up device 56 is substantially identical to the take-up device 54 except that it is symmetrically arranged, with the tangential fitting on the bottom so that cable fed into one device and out of the other will cause movement of the gear wheels in the same rotational direction.

Since gear wheel 64 and rear rail 22 are both rigidly connected to pivot pin 42, rotation of rail 22 in a clockwise direction will cause cable 58 to be fed out of device 54 and translate through sheath 78. Since the take-up devices are symmetrically arranged, the translating cable is fed into device 56 to effect a clockwise rotation of its gear wheel and thus a clockwise pivotal movement of rear rail 22. The axial rigidity of sheath 78 will cause any movement of rear rail 22 to be translated into synchronized movement of rear rail 24. Thus a force applied to either rear rail or to any portion of the top structure will effect a synchronized movement of both rear rails in either direction.

This arrangement precludes any binding of the top structure during folding and unfolding movement, regardless of where the operator applies the folding force. Since binding is precluded, the force required to fold the structure 17 is substantially decreased and the folding movement is much smoother than in present manually operated convertible top structures.

Figure 4:
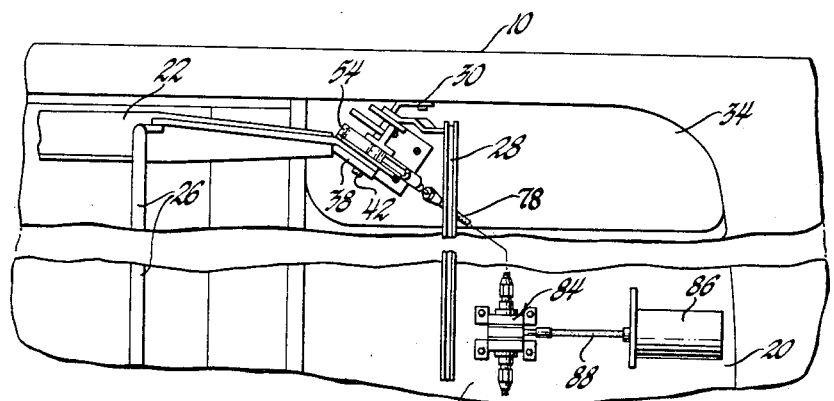
FIGURE 4 is a view similar to FIGURE 2 showing a modified embodiment of the invention utilizing a power actuating means.

The rear rail synchronizing means just described is readily adaptable to power actuation. As shown in FIGURE 4, a drive unit 84 engages cable 58 at a point between take-up devices 54 and 56. Drive unit 84 is driven by a rotary power source 86 through a rotary shaft 88. Power source 86 is preferably an electric motor, although a rotary fluid motor or other type of drive unit may also be used. Drive shaft 88 is preferably a flexible rotary cable which enables any convenient placement of power source 86 in storage well 20.

Figure 6:
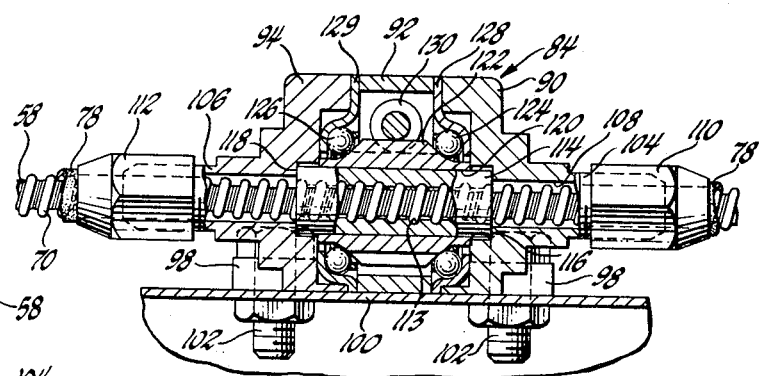
FIGURE 6 is a sectional view taken generally on the plane indicated by line 6—6 of FIGURE 5.
Figure 5:
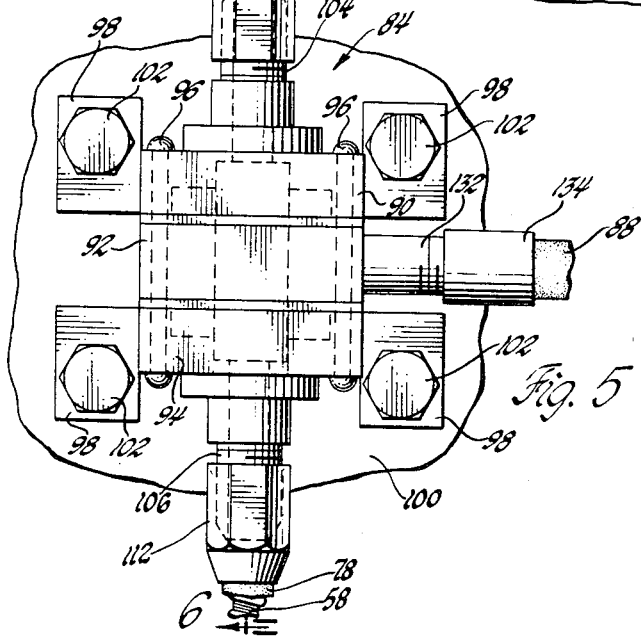
FIGURE 5 is an enlarged view of a portion of the power actuating means shown in FIGURE 4.

Referring now to FIGURES 5 and 6, drive unit 84 is shown in greater detail. The drive unit includes a housing comprising three members 90, 92 and 94 that are interconnected by bolts 96. The housing further includes flanges 98 for mounting the drive unit 84 to the floor 100 of storage well 20 at any convenient location by bolts 102. Housing members 90 and 94 include respective fittings 104 and 106 containing a bore 108 through which cable 58 may pass. Fittings 104 and 106 are threaded to receive nuts 110 and 112 which secure the inner ends of sheath 78 to drive unit 84.

Interiorly of drive unit 84, wire 70 of cable 58 is engaged by the internal thread 113 of a jackscrew 114 which is axially confined by flanges 116 and 118. Jackscrew 114 is press fitted or otherwise nonrotatably secured within a bore 120 of a worm wheel 122. Worm wheel 122 is rotatably supported by thrust bearings 124 and 126 which engage ball races 128 and 129 that are clamped by housing members 90, 92 and 94. Worm wheel 122 is adapted to be driven by a worm 130 rotatably supported in housing member 92. Worm 130 is mounted on a shaft 132 which extends outwardly of housing 92 where it is secured to rotary drive cable 88 by a fitting 134.

Actuation of the power source 86 will effect rotation of shaft 88, worm 130, worm wheel 122 and jackscrew 114. As jackscrew 114 rotates, the engagement of thread 113 with helical wire 70 will cause cable 58 to translate in one axial direction. Translation of cable 58 will effect rotation of the gear wheels which will cause rear rails 22 and 24 to pivot. Conversely, actuation of power source 86 in the reverse rotational direction will effect a reverse translation of cable 58 and a pivoting of rear rails 22 and 24 in the opposite direction. In this manner stop structure 17 may be selectively raised and lowered by power source 86. In this embodiment of the invention springs 46 and 48 may be omitted.

In the power actuation embodiment shown in FIGURES 4, 5 and 6, the use of a single power source and a common synchronizing cable enables synchronized movement of rear rails 22 and 24 which results in a smooth raising and lowering of top structure 17. Prior convertible top actuators have utilized a pair of power sources which presented a synchronization problem. As with the manually operated embodiment shown in FIGURES 1, 2 and 3, the lack of synchronization of movement of the rear rails in a powered top will cause a binding of the top structure, thereby requiring greater force to raise and lower the top. Thus the use of a single drive unit with the synchronizing cable enables the use of a smaller power source and effects a much smoother raising and lowering of the vehicle top. This embodiment also provides an improvement over rotary cable drive mechanisms in that no cable "wind up" is possible since cable 56 is translated rather than rotated.

The flexible or bendable nature of cable 58 and its sheath 78 enable placement in any convenient location that is available. This flexibility also permits usage with any rear rail configuration, whether coaxial or not. Thus this invention provides means for synchronizing the pivotal movement of convertible top rear rails which may be used with a manually-operated or a power-operated top structure. Further modifications of this invention will become obvious to those skilled in the art and are contemplated within the scope thereof.

We claim:
1. In a convertible vehicle body having a foldable top structure including first and second rear rails pivoted to the body for movement between raised and lowered position, means for synchronizing movement of the rear rails including control means mounted on the rear rails and a flexible synchronizing member drivingly interconnecting the control means and being translatable therebetween in response to a translating force on the cable to effect synchronized pivotal movement of both rear rails.

2. The synchronizing means recited in claim 1, wherein the control means include first and second gearing members mounted on the respective first and second rear rails, and the synchronizing member includes gearing means engaging the first and second gearing members for effecting translation of the control member in response to pivotal movement of the rear rails.

3. The synchronizing means recited in claim 2, wherein the flexible synchronizing member is a flexible spiral-wound cable and the gearing means is an outer helical wire mounted thereon, and the first and second gearing members include respective first and second gear wheels mounted for pivotal movement with the respective first and second rear rails.

4. The synchronizing means recited in claim 1, wherein the synchronizing means include actuating means engaging the flexible synchronizing member between the first and second rear rails and adapted to effect translation of the synchronizing member to pivot both rear rails in synchronization.

5. The synchronizing means recited in claim 4, wherein the actuating means includes drive means engaging the synchronizing member and a power source for actuating the drive means to effect translation of the synchronizing member.

6. The synchronizing means recited in claim 5, wherein the power source includes a rotary power actuator drivingly connected to the drive means.

7. The synchronizing means recited in claim 5, wherein the synchronizing member includes gearing means, and the drive means includes a worm drivingly connected to the power source, a worm gear drivingly engaging the worm and a jackscrew driven by the worm gear and drivingly engaging the synchronizing member gearing means, whereby actuation of the power source causes rotation of the worm, the worm gear and the jackscrew to effect translation of the synchronizing member and consequent pivoting of the rear rails in synchronization.

References Cited
UNITED STATES PATENTS

| | | | |
|---|---|---|---|
| 2,297,820 | 10/1942 | Westrope | 296—117 |
| 3,097,883 | 7/1963 | Gilson et al. | 296—137 |

LEO FRIAGLIA, *Primary Examiner.*

R. SONG, *Assistant Examiner.*